United States Patent [19]
Wilson et al.

[11] Patent Number: 5,386,492
[45] Date of Patent: Jan. 31, 1995

[54] SPEECH RECOGNITION SYSTEM UTILIZING VOCABULARY MODEL PRESELECTION

[75] Inventors: Brian H. Wilson, Somerville; Girija Yegnanarayanan, N. Chelmsford; Vladimir Sejnoha, Cambridge; William F. Ganong, Brookline, all of Mass.

[73] Assignee: Kurzweil Applied Intelligence, Inc., Waltham, Mass.

[21] Appl. No.: 905,345

[22] Filed: Jun. 29, 1992

[51] Int. Cl.⁶ .............................................. G10L 5/00
[52] U.S. Cl. ..................... 395/2.61; 395/2.64; 395/2.5
[58] Field of Search ............... 395/2, 2.31, 2.5, 2.51, 395/2.52, 2.62, 2.63–2.65; 381/41–43

[56] References Cited
U.S. PATENT DOCUMENTS

| | | | |
|---|---|---|---|
| 4,618,983 | 10/1986 | Nishioka et al. | 381/43 |
| 4,677,673 | 6/1987 | Ukita et al. | 395/2 |
| 4,712,243 | 12/1987 | Ninomiya et al. | 381/43 |
| 4,715,004 | 12/1987 | Kabasawa et al. | 395/2 |
| 4,783,804 | 11/1988 | Juang et al. | 395/2 |
| 4,866,778 | 9/1989 | Baker | 395/2 |
| 4,903,305 | 2/1990 | Gillick et al. | 395/2 |
| 4,975,962 | 12/1990 | Oka | 395/2 |
| 5,136,654 | 8/1992 | Ganong, III et al. | 381/41 |

*Primary Examiner*—David D. Knepper
*Attorney, Agent, or Firm*—Henry D. Pahl, Jr.

[57] ABSTRACT

Preliminary screening of vocabulary models is provided by successively applying two different high speed distance measuring functions which provide progressively increasing measurement accuracy. Both distance measuring functions utilize subsampled representations of the unknown speech segment and the vocabulary models. The initial screening function achieves very high speed by eliminating certain usual time warping constraints and by precalculating a table of distance values which can be used for all vocabulary models. The second screening function yields improved accuracy in spite of possible endpointing errors by comparing extra frames, preceding and following the presumed unknown word, with noise models appended to each vocabulary model.

9 Claims, 9 Drawing Sheets

SPEECH RECOGNITION SYSTEM UTILIZING VOCABULARY MODEL PRESELECTION

BACKGROUND OF THE INVENTION

The present invention relates to speech recognition and more particularly to methods for preselecting or screening candidate models for accurate matching with an unknown speech segment.

In order to be useful for many user applications, a speech recognition system should be capable of recognizing a large vocabulary of words. Distinguishing between words in a large vocabulary system requires that the system be capable of a high degree of accuracy in comparing an unknown speech segment with the models representing the vocabulary words. As is understood, high accuracy carries with it a substantial cost in terms of computational complexity and, while various techniques have been evolving for efficiently doing the necessary calculations, it has been becoming increasingly necessary to provide some method of screening or preselecting candidate models prior to applying a high precision matching algorithm. The present invention utilizes several novel methods to effect preselection of candidate models in such a way that unlikely candidates are quickly weeded out with minimal risk of eliminating the best matches.

SUMMARY OF THE INVENTION

The unknown speech segment is represented by a fine sequence of frames and the vocabulary models are represented by the respective fine sequences of states. Preferably, the model states are drawn from a limited collection of predetermined states. Both the unknown segment and the models are subsampled to obtain respective coarse sequences which are used in the screening distance measuring functions of the present invention. The subsampled sequences in effect define a matrix for each comparison.

In accordance with one aspect of the present invention, a table is precalculated for each unknown speech segment. The table holds, for each state in the limited collection, a measure of the degree of match of the subsampled input frame which provides the best match with that state in each possible state position. Preferably, the selection of best match is made without constraining the choice on the basis of adjacent states in the coarse sequence, a time warping constraint usually imposed in matching calculations, e.g. in accordance with Viterbi decoding. Accordingly, for each model to be considered, a cumulative value representing the overall match of the coarse sequence of frames with the respective coarse sequence of states can be quickly determined by simple accessing the table and accumulating the values obtained.

In accordance with another aspect of the present invention, likely start and finish endpoints of words in the unknown speech sequence are identified, but frames outside of the endpoints are compared with preselected noise models that are common to all the vocabulary models thereby to precalculate cost values for entering and exiting the matrix at locations different than the corners. This procedure accommodates for possible errors in the endpoint detection while adding very little to the overall cost of calculation since, for each unknown speech input segment, the evaluation of the segment match to the noise models is common to all reference models being considered.

A further improvement to both preselection distance measuring functions is to consider, for each comparison of an individual subsampled input frame with a model state, not only the subsampled frame but also a certain number of frames preceding and following the respective subsampled frame. Since this consideration of other frames is done only on an individual matching basis rather than in combination or a permutation with the neighbors of successive subsampled frames, the computational burden is not greatly increased.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
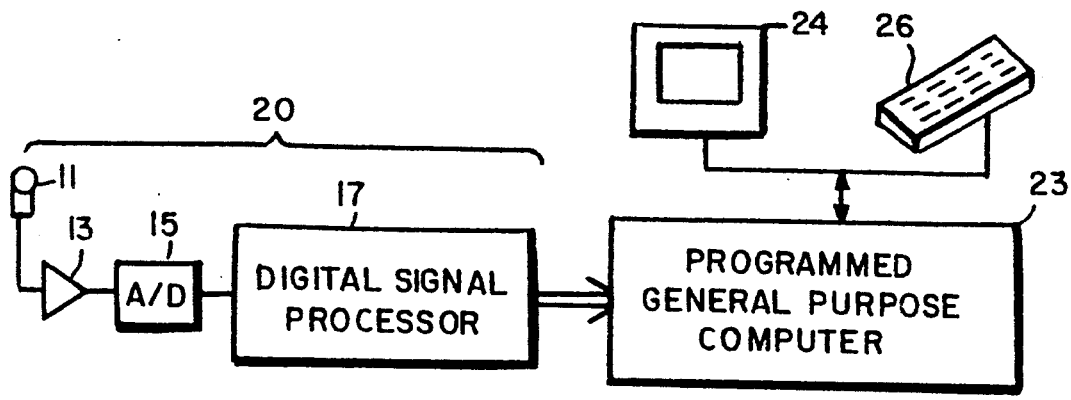
FIG. 1 is a block diagram of speech recognition apparatus employing methods of vocabulary model preselection in accordance with the present invention.

In common with many prior art systems, the apparatus of the present invention operates by first transducing acoustic speech waveform to obtain corresponding electrical signals and then digitizes those signals. With reference to FIG. 1, the transducer there indicated is a microphone 11 which is connected, through a suitable preamplifier 13, to an analog-to-digital converter 15. As is also usual in the art, the speech signal is treated to obtain, at a succession of sample times, a sequence of digital values which characterize the speech. In the embodiment illustrated, these values are obtained by passing the speech signal through a digital signal processor 17 which performs a Fourier transform so as to extract spectral features characterizing the input speech. The collection of digital values defining the input spectrum at a given moment of time is referred to hereinafter as a frame. Each frame may be considered to be a multidimensional vector as understood by those skilled in the art.

Collectively, the front end circuitry is identified by reference character 20. Though the input signal processing is illustrated as being implemented digitally, it should be understood that analog filtering followed by analog-to-digital conversion might also be used. Likewise, while multichannel filtering is presently preferred, it should be understood that other methods of treating or encoding the raw input signal might also be employed, for example, linear predictive encoding which might also be done by special purpose hardware.

A general purpose microcomputer system 23, e.g. one employing an Intel 80386 microprocessor, is provided for general system management and control functions, as well as for processing of the distance or scoring calculations and the implementation of the algorithms of the present invention. As is conventional, computer 23 incorporates a video display 24 and a keyboard 26 for providing interaction with the system user.

The raw spectral information obtained from the front end circuitry 20 is further preprocessed in the computer 23 to replace each sample spectrum with a pair of indices or pointers the first of which corresponds to or identifies one of a predetermined set of standard spectral distributions and the other of which identifies one of a predetermined set of standard energy level values. In the particular embodiment being described, 256 such standard spectra are utilized. Other codebook sizes are of course possible. While the system can accommodate 256 standard energy values, only about 80 are practically needed and actually used in the system. In the art, this substitution is conventionally referred to as vector quantization and the indices are commonly referred to as VQ indices.

As indicated previously, vocabulary models are represented by sequences of states and each state is defined by a spectral index and an energy index. Rather than corresponding to the frame spectral indices, the state spectral indices identify or correspond to probability distributions. The state spectral index serves as a pointer into a table which identifies, for each state index, the set of probabilities that each frame or VQ index will be observed to correspond to that state index. The table is, in effect, a precalculated mapping between all possible frame spectral indices and all state spectral indices. A corresponding table is provided for mapping frame energy indices with state energy indices. Thus, for comparing a single frame and single state, a distance measurement or a measure of match can be obtained by directly indexing into the tables using the respective indices and combining the value obtained with appropriate weighting. In the particular implementation being described herein, the distance obtained from the spectral mapping table is doubled and then added to the value obtained from the energy mapping table to yield a total distance or cost value representing the extent of match between an incoming frame and a given state.

While pairs of indices are used to identify or characterize a single frame of input data in the particular embodiment being described, it should be understood that single index systems are known in the art and the methods of the present invention can be applied to such systems. In parts of the following description, there is often reference to a frame index for purposes of simplifying the description when, in fact, either a single VQ index or a pair of such indices (spectral and energy) could be used.

As is understood by those skilled in the art, the distance or likelihood values which fill the tables can be generated by statistical training methods. Various such training methods are known in the art and, as they do not form a part of the present invention, they are not described in further detail herein. Rather, for the purposes of the present invention, it is merely assumed that there is some metric for determining degree of match or likelihood of correspondence between input frames and the states which are used to represent vocabulary models. The preprocessing of the input data by the computer 23 also includes an estimating of the beginning and end of a word in an unknown speech input segment based on the energy level values. It should also be understood that the particular embodiment being described is a discrete word recognizer rather than a continuous speech recognizer but that the methods of the present invention could be applied to either type.

As is also understood by those skilled in the art, natural variations in speaking rate require that some method be employed for time aligning a sequence of frames representing an unknown speech segment with each sequence of states representing a vocabulary word. This process is commonly referred to as time warping. The sequence of frames which constitute the unknown speech segment taken together with a sequence of states representing a vocabulary model in effect define a matrix and the time warping process involves finding a path across the matrix which produces the best score, e.g. least distance or cost. The distance or cost is typically arrived at by accumulating the cost or distance values associated with each pairing of frame index with state index as described previously with respect to the VQ (vector quantization) process.

As is understood by those skilled in the art, the final comparing of an unknown speech segment with competing vocabulary models must be highly accurate if the procedure is to discern between similar and competing vocabulary models in a system having a large vocabulary. High accuracy comparisons are computationally intensive, even using vector quantization techniques, since a large number of possible paths across the matrix must be explored. A presently preferred form of time warping for the final or most precise matching function is disclosed in co-pending and coassigned application Ser. No. 07/895,618 filed by Vladimir Sejnoha on Jun. 9, 1992 and entitled Speech Recognizer.

In order to reduce the number of high accuracy comparisons which must be performed, the present invention utilizes a succession of screening steps to preselect candidates. The preselection process quickly eliminates unlikely candidates but raises very little risk of incorrectly screening out a good candidate.

In the screening system implemented in the particular embodiment being described, two different high speed distance measuring functions are utilized to successively select candidate models with progressively improving accuracy of match measurement. These distance measuring functions are described in greater detail hereinafter but the following brief description serves to generally characterize the two functions so that their use in the overall system may be described. Both distance measuring functions utilize subsampling or compressing of the unknown speech segment and the models with which the unknown segment is being compared. The second or more precise of the distance measuring functions, referred to hereinafter as DM2, essentially performs a conventional time warping of the subsampled unknown against each subsampled candidate model but with a high accuracy, implicit endpointing procedure which greatly improves accuracy notwithstanding the subsampling. The initial and highest speed distance measuring function, referred to hereinafter as DM1, performs what might be considered a very loosely constrained time warping of the subsampled sequences utilizing a precalculated table of minimum distance values for each state index that allows comparison of the unknown with a large number of models while involving minimal computational load.

As indicated previously, the present invention has particular utility in large vocabulary speech recognition systems, e.g. systems having a vocabulary of in the order of 50,000 words. In such systems, it is highly desirable that the vocabulary be partitioned and that the models within each partition be represented by a representative one of the models. A method of partitioning a vocabulary and of selecting candidates from the vocabulary is disclosed in copending, coassigned application Ser. No. 07/424,139 filed by William F. Ganong, III; William F. Bauer; Daniel Sevush; and Harley M. Rosnow on Oct. 19, 1989 and entitled Speech Recognition. The disclosure of application Ser. No. 07/424,139 is incorporated herein by reference.

Figure 2:
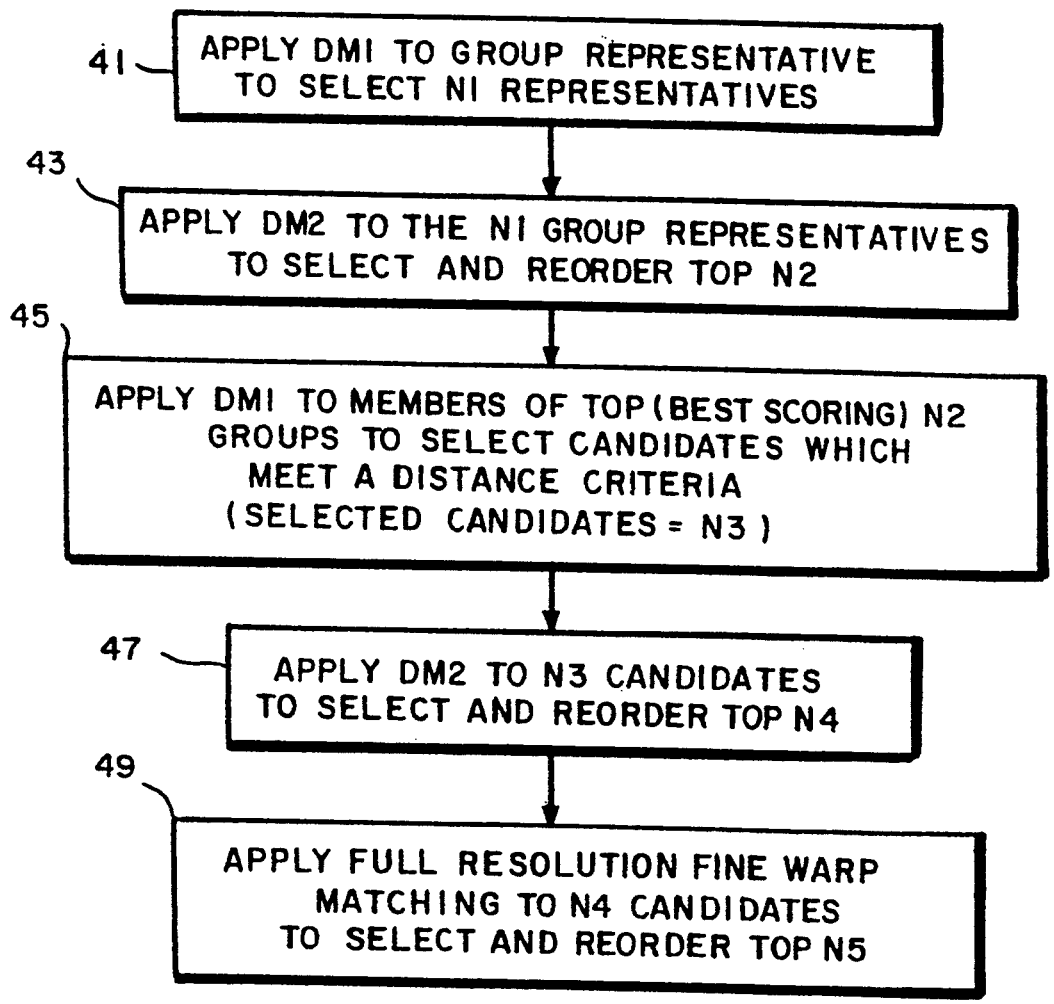
FIG. 2 is a flowchart illustrating the overall process for preselecting candidate models for subsequent high accuracy comparison with an unknown speech segment.

The overall procedure for preselecting candidate models for high accuracy comparison with the unknown speech segment is illustrated in FIG. 2 and, as may be seen, each of the distance measuring functions (DM1 and DM2) is applied to both the group or partition representatives and, thereafter, to members of the better scoring groups and/or partitions. As a first step, the fastest distance measuring function is applied to the whole collection of group representatives to select the most likely N1 of those representatives, this step being designated by reference character 41. The more precise distance measuring function DM2 is then applied to the N1 group representatives (step 43) to select and reorder the most likely ones of those, up to a second preselected number N2. After the most likely groups or partitions have been selected, the high speed distance measuring function DM1 is again utilized (step 45), this time being applied to the members of the selected partitions and is utilized to select candidates which meet a predetermined distance criteria, the number of candidates thereby selected being designated N3. The more precise distance measuring function DM2 is then applied (step 47) to the N3 candidates previously obtained thereby to select and reorder a smaller number of them, designated N4. The full resolution fine warp, i.e. utilizing the fine sequence of frames and the fine sequence of model states, is then applied (step 49) to finally determine and order a list of words from the vocabulary which is then output to the user program.

Figure 3:
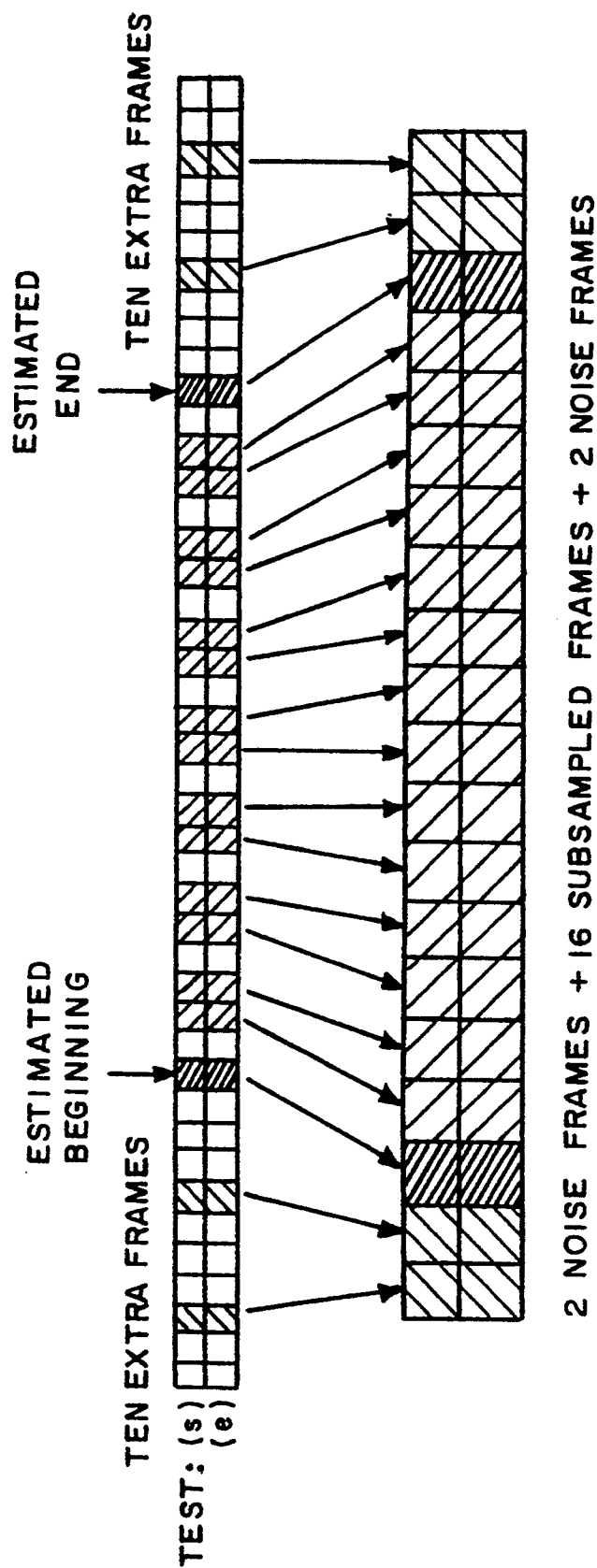
FIG. 3 is a diagram illustrating subsampling of a sequence of frames representing an unknown speech segment.
Figure 4:
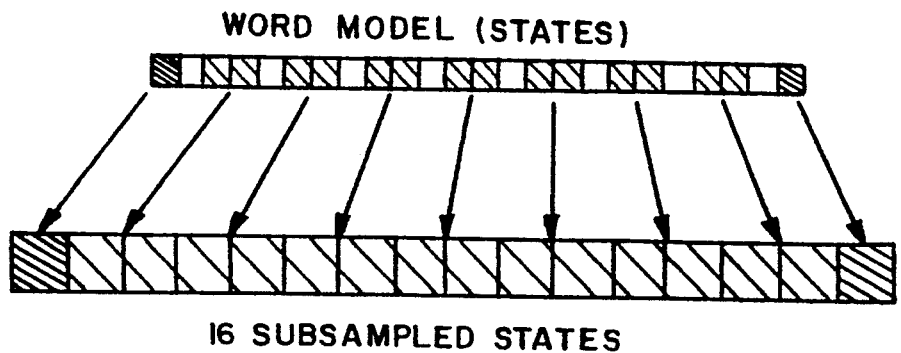
FIG. 4 is a diagram illustrating subsampling of a sequence of states representing a vocabulary model.

As indicated previously, the original unknown speech input is represented by a fine sequence of frames and each vocabulary model is represented by a fine sequence of states. The frame and state sequences may not be equal in length, that is, they may comprise different numbers of elements. The number of elements in each is typically in the order of 100. To compress the input segment and models, the sequences are linearly subsampled so that the compressed version includes the first and last elements and so that the total number of elements in each sequence totals 16. This subsampling as applied to the input frames is graphically illustrated in FIG. 3. As indicated previously, the preprocessing of speech input includes a designating of likely beginning and terminal endpoints for the word being spoken. However, as this endpointing procedure is subject to some error, the system actually processes and stores a predetermined number of frames preceding the start endpoint and the same number of frames following the finishing endpoint. In the embodiment illustrated, there are ten such extra frames at each end. These extra frames from the fine sequence are used in certain calculations, as described in greater detail hereinafter with reference to the second distance measuring function DM2, to obtain extra frames for the coarse or compressed sequence and these calculations provide a more accurate representation than mere linear subsampling of the extra frames from the fine sequence. FIG. 4 is a similar graphic illustration of linear subsampling of a fine sequence of states representing a vocabulary model.

Figure 5:
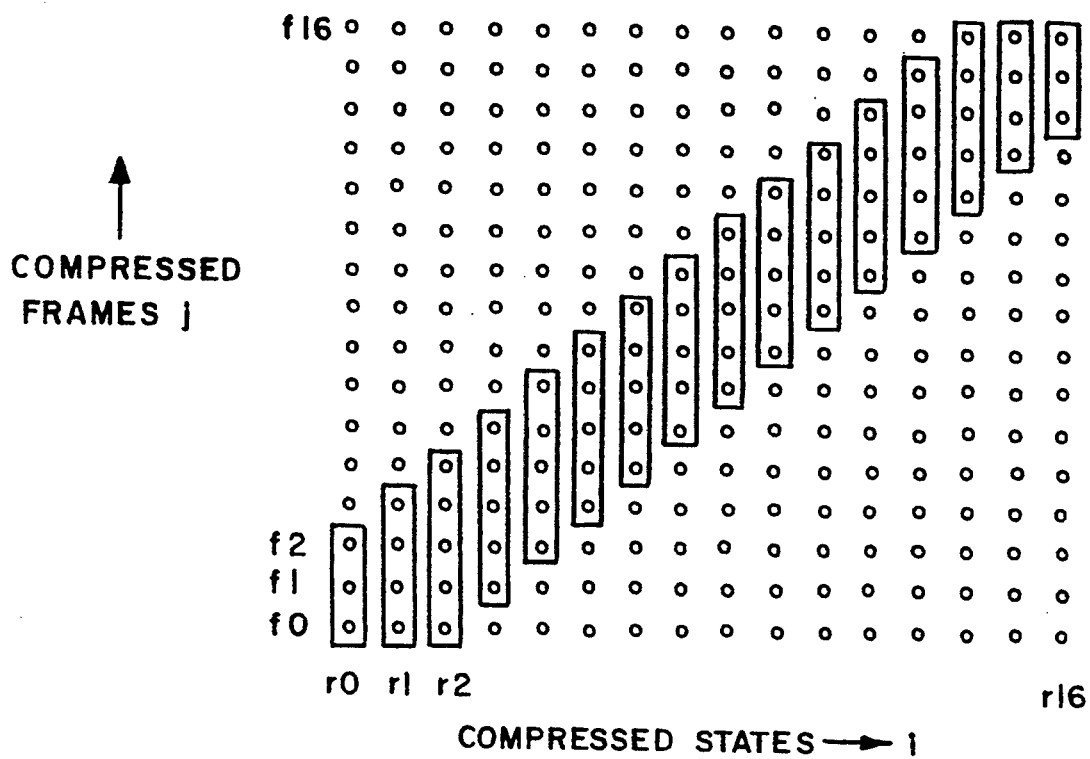
FIG. 5 is a diagram graphically illustrating the operation of the distance measuring function of FIG. 2.
Figure 6:
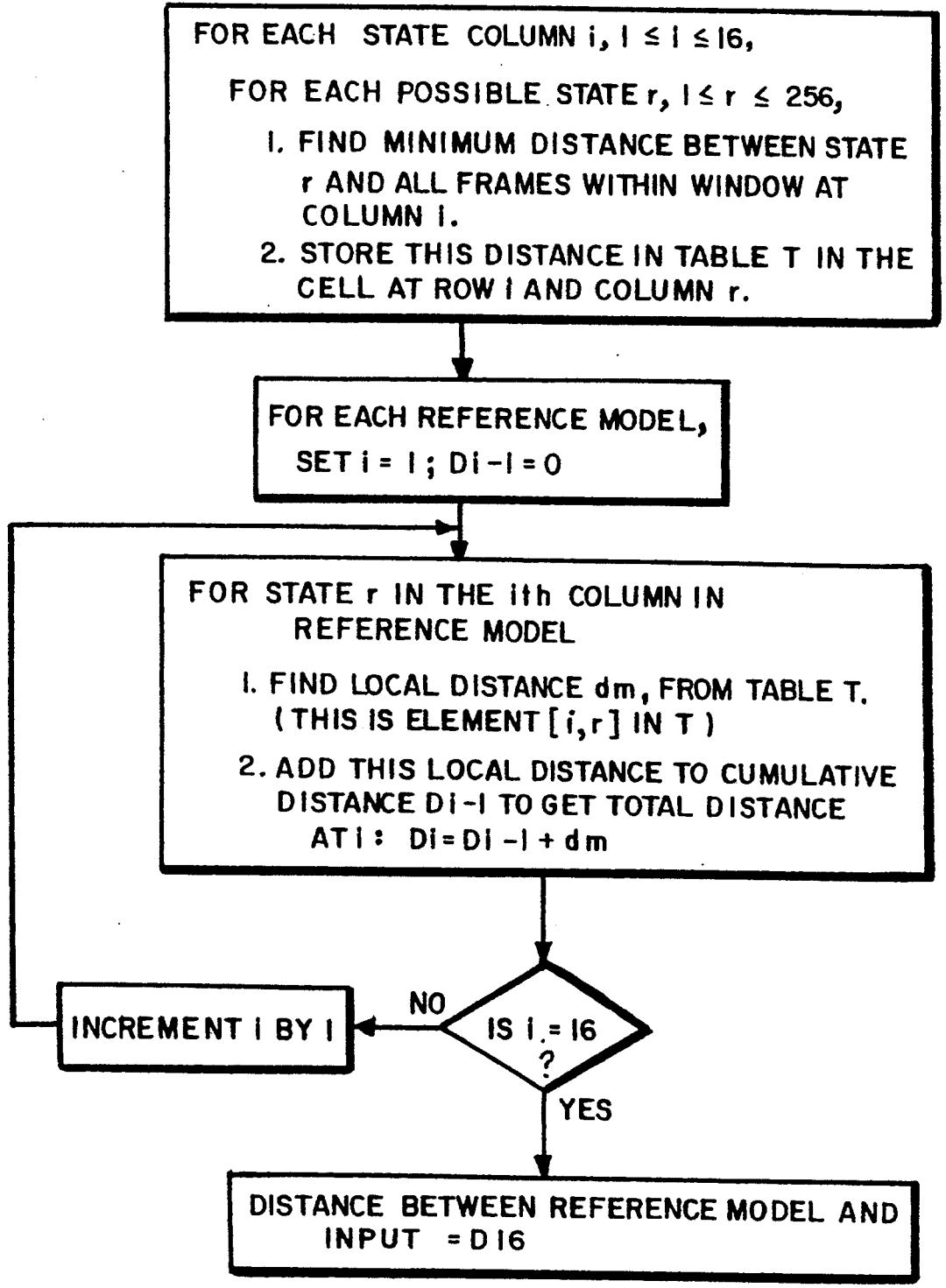
FIG. 6 is a flowchart illustrating a first distance measuring function employed in the process of FIG. 1.

As indicated previously, the fastest of the distance measuring functions (DM1) operates without some of the constraints usually applied in time warping procedures and utilizes certain precalculated minimum distance measurements to speed the screening of a large number of candidate models. With reference to FIGS. 5 and 6, the distance measuring function DM1 compares 16 linearly subsampled frames from the unknown speech sequence with 16 linearly subsampled states from each vocabulary model which is to be considered, this comparison being represented by the matrix in FIG. 5. Not all locations within the matrix are considered but, rather, the number of frames being considered in connection with each state column is constrained to a window of predetermined size. In FIG. 5, the windows are indicated by the enclosed block for each state column. In conventionally determining a time warped path through such a matrix, the path is usually subject to some local constraint, e.g. being constrained so that each location can be approached only from its left, from below, or the diagonal between those two directions. The distance function DM1, however, does not observe that constraint but, rather, in each state column, the method determines the frame which provides the best match, i.e. the lowest distance or cost, for the state which occupies that column, and considering only those frames within the preselected window or corridor for that state column but without consideration of the determinations to either side of the current state column. This is essentially a calculation involving finding the minimum among the values available in the window.

In accordance with another aspect of the invention, it is not necessary to calculate these minimums for each new model which is to be considered. Rather, once the subsampled sequence of input frames is determined, the method determines, for each state column and for each the 256 states which could occupy that column, the minimum cost or distance, i.e. the cost or distance for that one of the frames being considered which provides the best match. The cost values are stored in a table which is then utilized for scoring all models. This is thus a table which comprises 16×256 entries and which contains, at each table location, a value representing the corresponding minimum for the corresponding state index occupying the corresponding state column. Accordingly, as each new model is considered, cost values for each state column can be obtained by simply indexing into the table using the column number and the index of the state which occupies that column and extracting the minimum cost value. The overall measure of match of the unknown input segment with the model is then just the sum of those cost or distance values. As will be understood by those skilled in the art, this table lookup and summing operation is a very simple operation which can be accomplished relatively quickly. Thus a large number of models can be rapidly considered. The procedure is illustrated in the flowchart of FIG. 6.

As indicated previously, the accuracy of the cumulative match measurement obtained by this distance measuring function is not adequate for final selection. However, because the errors tend to produce candidates which score better than they should rather than lowering the score of good candidates, the method is highly effective at eliminating unlikely candidates while it produces very little risk that a good candidate will be rejected at the preselection stage. In terms of probabilistic mathematics, the scoring procedure of the distance measurement function DM1 can be explained as follows.

We assume that the reference model is fixed and the input vector sequences may suffer from errors due to wrong endpointing, linear subsampling etc.

For each model M, we need to compute the probability of observing the input vector sequence F or a variant of it, given the fixed reference state sequence R. Each of the vectors fj could have been generated at any of the times i by the reference state ri. Hence, the probability that the vectors in F were generated by the fixed state sequence R is given by $$P(F/M) = \Pi\Sigma_{i\,j} P(fji/ri) * P(fji) \quad (1)$$

where

P(fji) = probability that the vector fj is the ith in the sequence

P(fji/ri) = O(fj,ri) = probability of observing the vector fj in the state ri

We use some assumptions to simplify equation (1)

(1) We assume that only a few vector sequences that are temporally close to F are likely to be the appropriate sequences for the given input utterance. That is, P(fji) = Wji max(1, i−N) ≦ j ≦ min(16, i+N) {where Wji ≦ ½N+1} = O otherwise The max and min operations are provided for proper behavior at the boundaries.

(2) We assume that the sum of probabilities can be approximated by the maximum value of these probabilities.

Equation (1) can now be rewritten as $$P(F/M) = \quad (2)$$

$$\Pi \max_{i} \text{ over } j \{O(fj,ri) * Wji\} \text{ for max}(1, i - N) \leq j \leq \min(16, i + N)$$

We set the probabilities Wji to be equal to 1/(2N+1) for all j within the window i−N to i+N and ignore the resulting constant which is the same for all reference models. We take −log( ) on both sides of the equation and denote −logO(fj,ri) as d(fj,ri) and −logP(F/M) as D(F, w).

$$D(F,w) = \sum_{i} \min d(fj,ri) \cdot \text{for max}(1, i - N) \leq j \leq \min(16, i + N) \quad (2)$$

This algorithm can be summarized as
  BEGIN: Initialize i=1; D(F,w)=O;
  For each reference state ri in the model M,:
    step 1: get d(fj,ri) for ri and each vector fj within a window of 2N+1 vectors around fj applying appropriate window sizes at the boundaries.
    step 2: find the minimum of these d(fj,ri)
    step 3: add this to D(F,w)
    step 4: If i=16, stop and output D(F, w); else, increment i and repeat from step 1

As is understood by those skilled in the art, a system based on subsampling a fine sequence of elements is somewhat sensitive to the particular timing or phasing at which the subsamples are taken from the fine sequence. Such errors can be substantially reduced by performing the distance measuring functions of the present invention not only to the subsampled sequence which is based directly on the presumed endpoint but also by applying the measuring function to subsamples which are linearly shifted from the initial sequence. While this procedure multiplies the number of calculations which must be performed by the number of shifted sequences to be tried, the distance measuring functions of the present invention are minimally demanding of computational capacity and thus the additional computational time may be relatively easily borne. This alternative can be expressed in probabilistic terms as follows.

To overcome the problems of linear subsampling, we try to maximize the probability of observing not just one, but a number of sequences derived from the same input utterance. Each of these sequences are assumed to be derived by linearly shifting the original input vector sequence, with proper padding at the ends and then sampling each such shifted sequence. If each of these "n" alternate sequences is denoted by Fs, we can maximize the probability P(Fs/M):

$$P(Fs/M)=P(F1/M)*(F2/M)\ldots P(Fn/M)$$

This is achieved by replacing each vector fi in F by a set of vectors s1,s2 . . . sn around it.

This modifies the distance d(fi,rj) to be a sum:

$$d(fj,ri) = - \sum_{n} \log(O(fn,ri)) \quad (3)$$

Since a set of input vectors are now stuffed in place of one sample vector fj, this procedure is conveniently referred to as "frame stuffing". Using the average instead of the sum in (3) preserves the dynamic range of the distances. This "frame stuffing" technique is also advantageously applied to the second distance measuring function.

As indicated earlier, the second distance measuring function DM2 performs a more conventional time warp function across the matrix of subsampled sequences in that the time warp observes the usual constraints that only those paths are considered which approach a given location from the left, from below, or from the diagonal between those two directions. This distance measure, however, provides substantially improved accuracy by allowing entry to and exit from the matrix at points in addition to the diagonal corners. This is accomplished by matching extra frames preceding and following the presumed word endpoints with noise models appended to the vocabulary word model. These are designated by reference characters 73 and 75 respectively.

Figure 7:
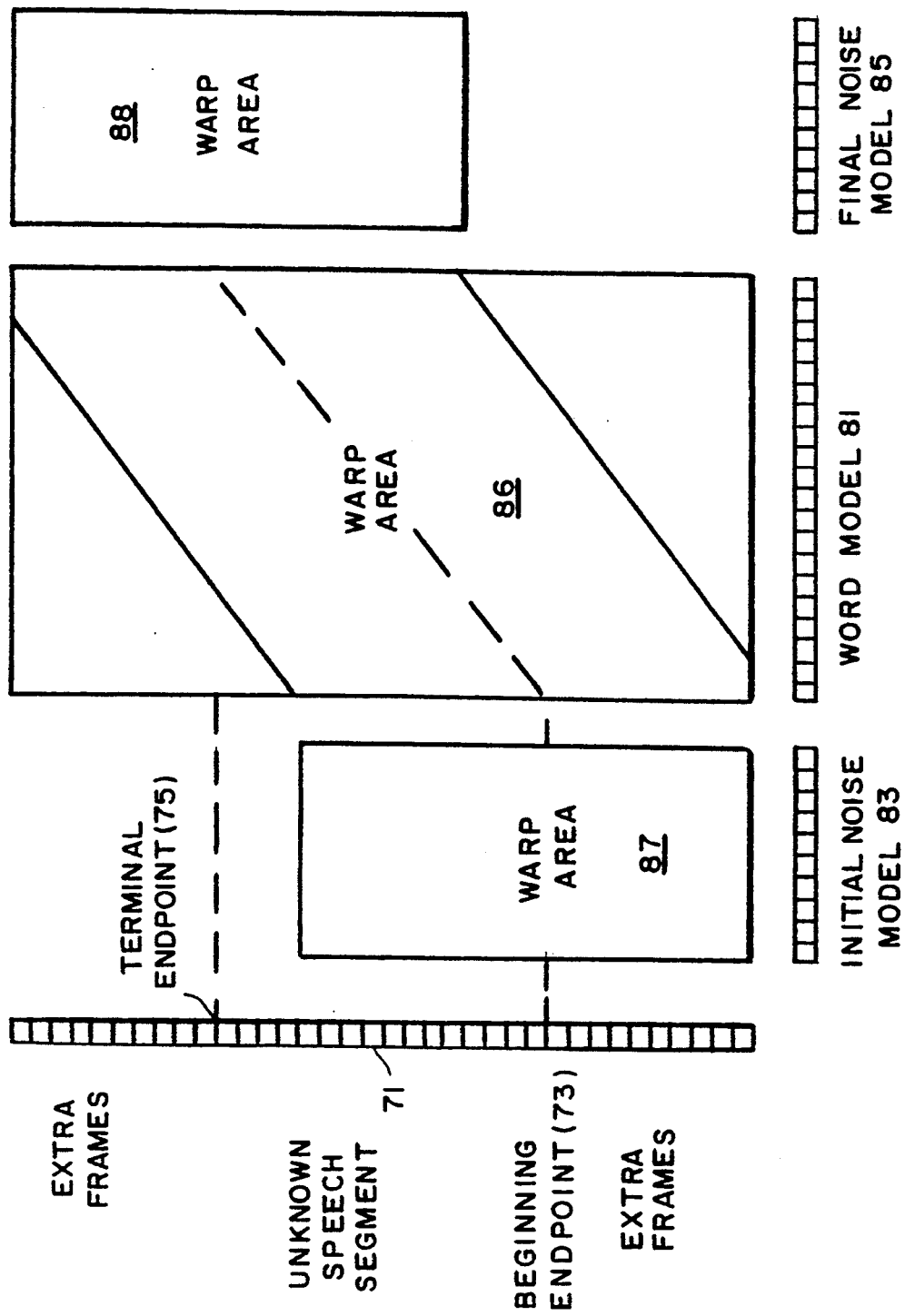
FIG. 7 illustrates the comparison of frames outside of the determined endpoints of a word in an unknown speech segment with preselected noise models appended to a word model to accommodate possible errors in the identification of endpoints.

As illustrated graphically in FIG. 7, the unknown speech segment 71 comprises, in compressed form, sixteen frames marked off by beginning and terminal endpoints as determined by the endpointing function during preprocessing. In accordance with the distance measuring function DM2, however, the unknown input segment also comprises ten extra frames preceding and following the presumed input word. Each vocabulary model which is to be compared with the unknown input segment comprises, in compressed form, 16 states as indicated at reference character 81. Appended to each model is an initial noise model 83 and a final noise model 85. These noise models are based on typical background noise and the same noise models are used for all the different word models being considered. The initial extra frames and the initial noise model define an entry extension warp region as designated by reference character 87 in FIG. 7 while the following extra frames and the final noise model define an exit extension warp region 88. Both the extra frames preceding and following the unknown word and the initial and final noise models are in uncompressed or finely gradiated form as initially taken.

Figure 8:
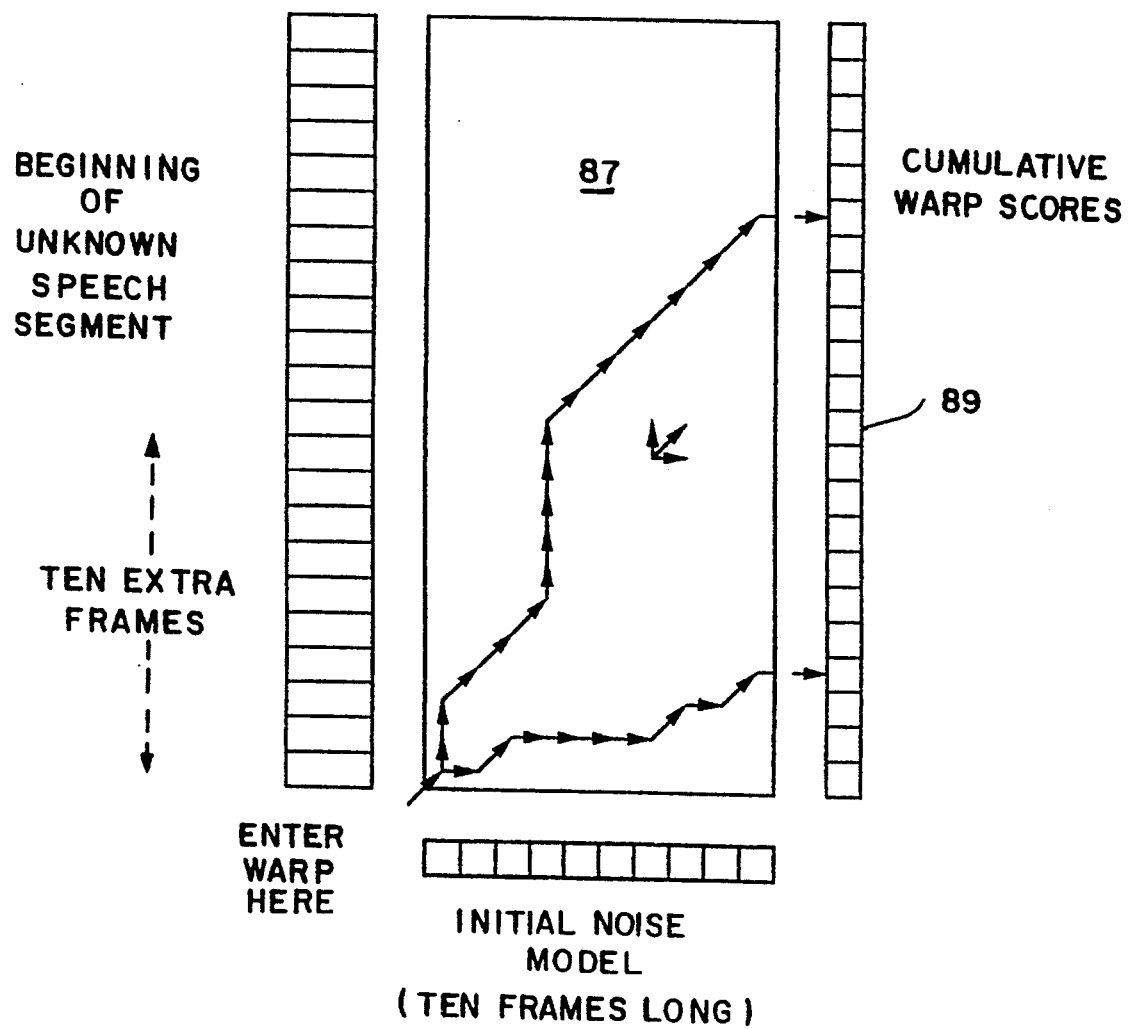
FIG. 8 illustrates the procedure of comparing the initial set of extra frames with the initial noise model to get cost values for entering a matrix comparing an unknown word with a model at different entry points.
Figure 9:
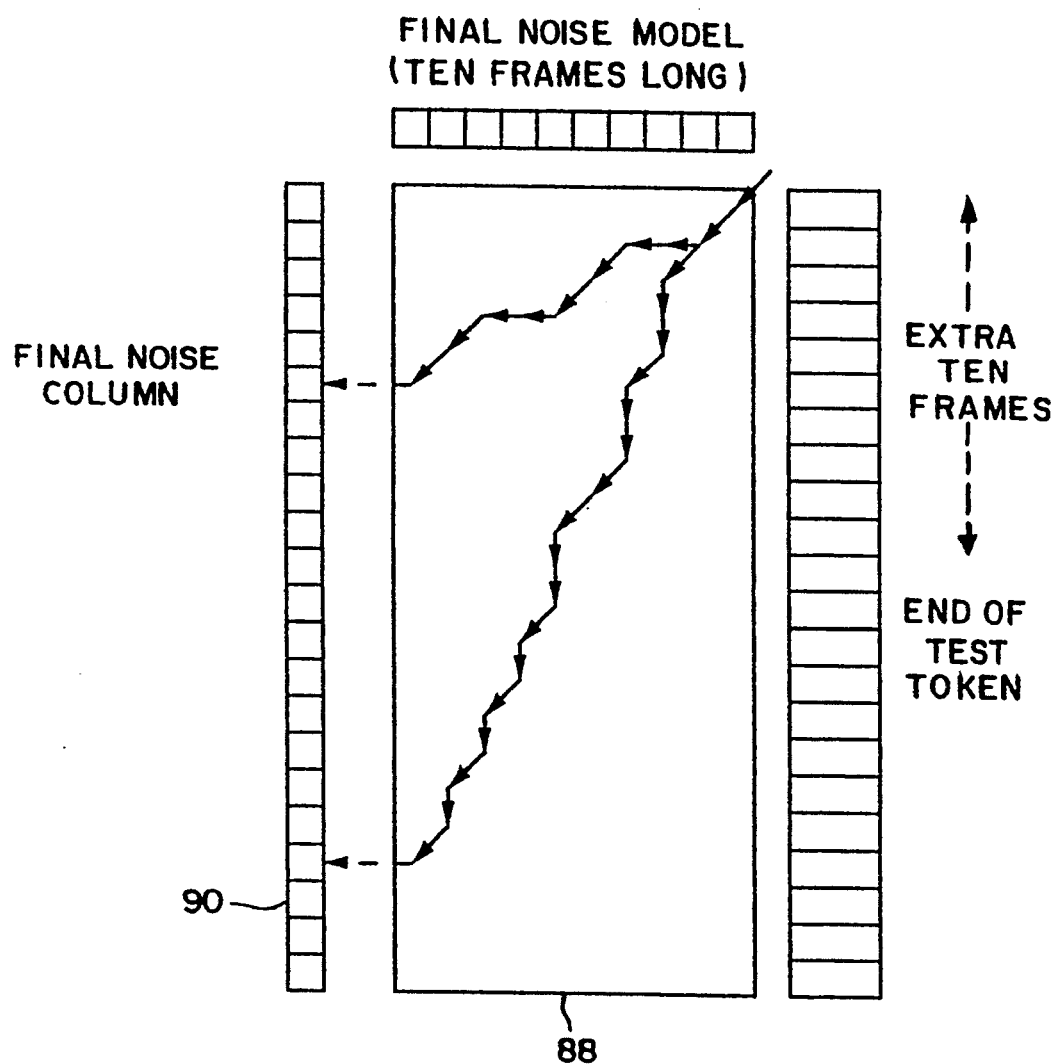
FIG. 9 is a diagram illustrating a procedure for calculating cost of exiting a comparison matrix at different points.

Since the extra frames remain the same as successive models are compared to the test input and since the same noise models are used for the successive word models, the cost values associated with different warp paths through the entry extension region can be calculated once as illustrated in FIG. 8 and then stored in a table as designated by reference character 89. The stored values can then be used as cost values for entering the main warp matrix area at different locations during the match calculations for all of the different vocabulary models which are to be considered. In the exit extension warp region 88, a reverse time warp is performed as illustrated in FIG. 9, i.e. starting from the upper right hand corner, to provide costs associated with exiting the main warp region 86 at different locations. These values are also stored in the column table as indicated by reference character 90. As is understood by those skilled in the art, the same values are obtained whether the path is calculated in the forward or reverse direction.

Figure 10:
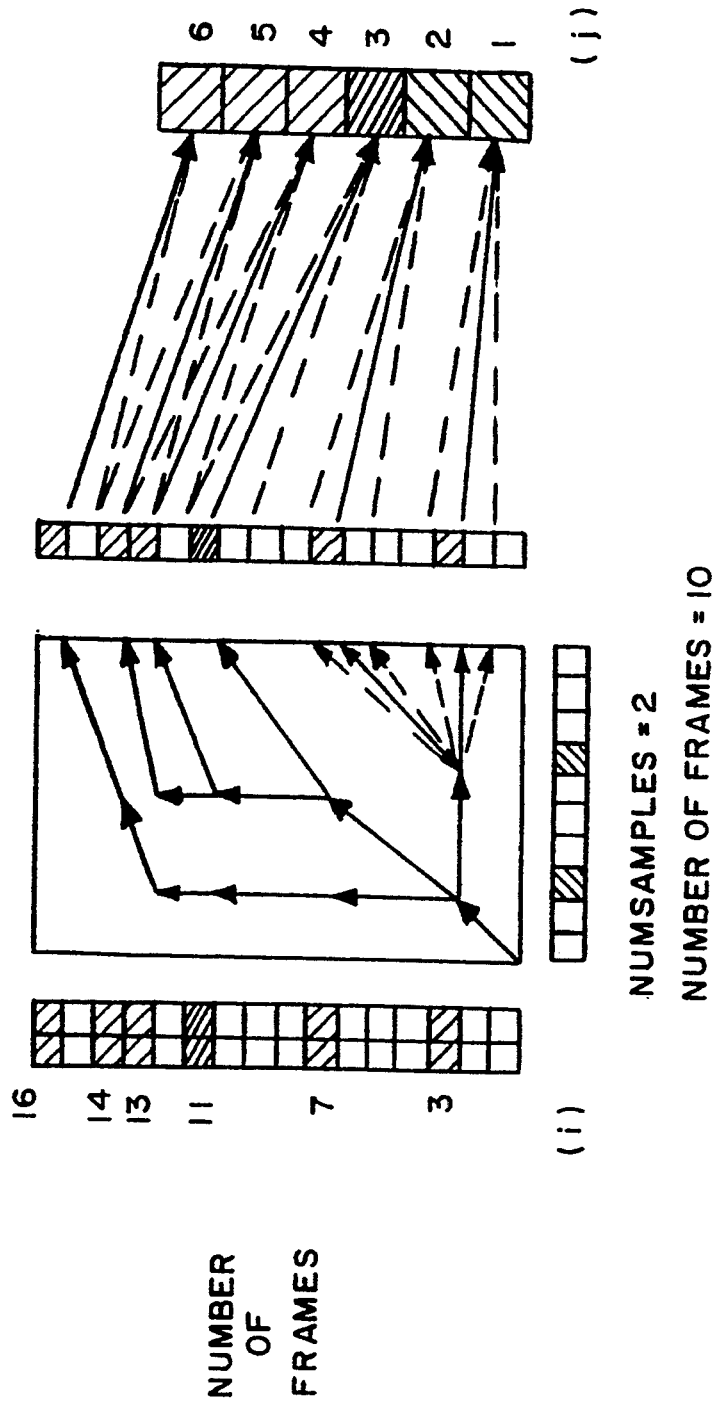
FIG. 10 is a diagram illustrating a procedure for compressing entry and exit values derived as illustrated in FIGS. 8 and 9.

As indicated previously, the cost values associated with traversing the extension warp regions are calculated based on the finely gradiated sequences of frames and states. The fine sequences are then compressed as illustrated in FIG. 10 and the cost values are normalized to compensate for the greater number of frames and states traversed during the time warping in the extension regions. We take two samples from the ten frames preceding the initial endpoint by choosing every fourth sample going from the proposed endpoint towards the start of the extra ten frames. Similarly, in the extra ten frames following the terminal endpoint, we choose every fourth sample going from the proposed endpoint towards the end of the extra ten frames—this gives two samples after the proposed terminal endpoint. We then use the corresponding samples from the normalized, finer noise distances column in DM2.

Figure 11:
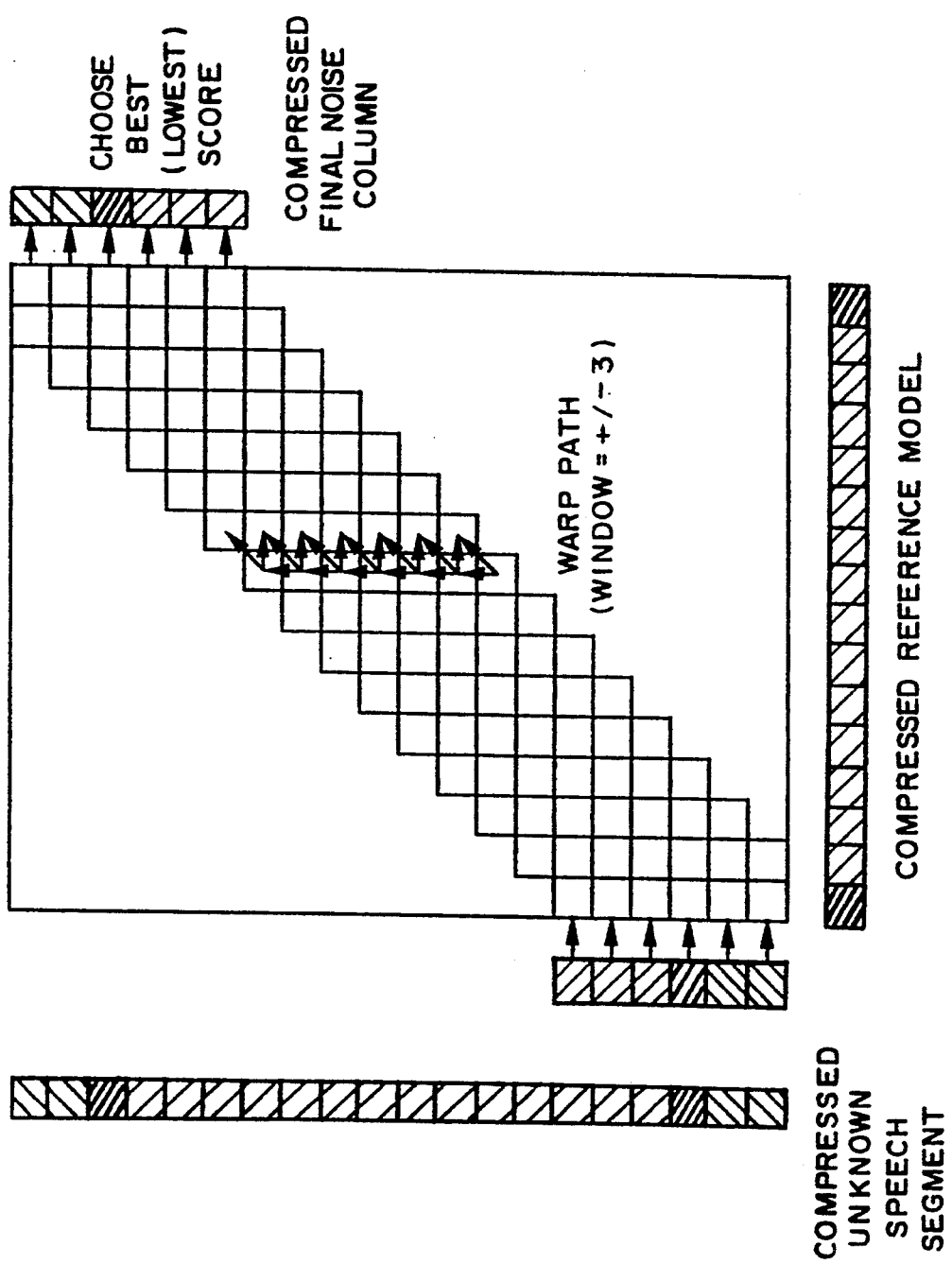
FIG. 11 is a diagram illustrating a time warping procedure through a matrix of subsampled input frames and subsampled vocabulary model states.

The compressed test input with compressed extension regions can then be time warped against the compressed reference token as illustrated in FIG. 11. In doing the time warp, the locations considered are preferably constrained to a corridor so as to reduce the total number of calculations substantially. In the embodiment illustrated, the corridor provides, for each state, column a window which encompasses plus and minus three frame positions from the shortest path diagonal. The best score obtained from this time warping will thus allow for or accommodate some error in the endpointing performed by the preprocessing and provide a more accurate measurement of the degree of match between the unknown input and the respective vocabulary word model.

As indicated earlier, this second distance measuring function DM2 is utilized twice in the overall system to improve initial screenings by the faster distance measuring function DM1, each of the distance measuring functions being applied initially to the collection of models which represent partitions and then to members of the better scoring partitions. Though the selection process thus involves multiple stages, the stages are gradiated in accuracy with the earliest screenings being performed by the fastest functions. Further, to the extent that the screening functions do not produce accurate results, it is the direction of allowing less likely candidates to exhibit better scores rather than worsening the scores of likely candidates and thus overall speed of selection is markedly improved while incurring minimal risk that the best or any good candidate will be eliminated inappropriately.

In view of the foregoing it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. In a speech recognition system which compares an unknown speech segment represented by a fine sequence of frames with a vocabulary of models represented by respective fine sequences of states, said states being selected from a limited collection of predetermined states, thereby to determine the best matches; a computer implemented method of preselecting candidate models for accurate comparison, said method comprising:

for each model to be considered, subsampling the corresponding fine sequence of states to obtain a respective coarse sequence comprising a predetermined number of states;

subsampling said fine sequence of frames to obtain a coarse sequence comprising a predetermined number of frames, said predetermined numbers together defining a matrix having frame positions along one axis and state positions along another axis, there being a preselected region within said matrix which is examined by said method;

for each state in said limited collection, determining for each state position in said matrix the input frame which provides the best match with that state, irrespective of the frame determined in connection with any adjacent state position and considering and examining only frames which lie within said preselected region, a measure of the match being stored in a table;

calculating, using said table, for each model to be considered a value representing the overall match of said coarse sequence of frames with the respective coarse sequence of states;

preselecting for accurate comparison those models with the better overall match values as so calculated.

2. The method as set forth in claim 1 wherein said overall match value is obtained by accumulating the respective measures of match stored in said table.

3. The method as set forth in claim 1 wherein, in determining the input frame which provides the best match for each possible state in each possible matrix position, the method examines not only the respective subsampled frame but also a preselected number of frames which precede and follow the respective subsampled frame in said fine sequence of frames.

4. In a speech recognition system which compares an unknown input speech segment with a vocabulary of models and in which input speech is encoded as a fine sequence of frames and means are provided for identifying the likely start and finish endpoints of words in said fine sequence, said models being represented by correspondingly fine sequences of states; a computer implemented method of preselecting candidate models for accurate comparison, said method comprising:

for each model to be considered, subsampling the corresponding fine sequence of frames to obtain a respective coarse sequence comprising a predetermined number of states;

subsampling said fine sequence of frames between said endpoints to obtain a coarse sequence comprising a predetermined number of frames, said predetermined numbers together defining a matrix having frame positions along one axis and state positions along another axis;

comparing a preselected number of frames preceding said start endpoint with a preselected noise model thereby to precalculate cost values for entry into said matrix at different frame position locations;

comparing a preselected number of frames following said finish endpoint with a preselected noise model thereby to precalculate cost values for exit from said matrix at different frame position locations;

for each model to be considered, determining a best match path across said matrix including the cost of entry to and exit from the matrix at different frame position locations, and scoring the model on the basis of that best path;

selecting, for accurate comparison with the input speech segment, those models with the best scores thusly obtained.

5. The method as set forth in claim 4 wherein, in determining the input frame which provides the best match for each possible state in each possible matrix position, the method examines not only the respective subsampled frame but also a preselected number of frames which precede and follow the respective subsampled frame in said fine sequence of frames.

6. In a speech recognition system which compares an unknown speech segment represented by a fine sequence of frames with a vocabulary of models represented by respective fine sequences of states thereby to determine the best matches; a computer implemented method of preselecting candidate models for accurate comparison, said method comprising:

for each model to be considered, subsampling the corresponding fine sequence of states to obtain a respective coarse sequence comprising a predetermined number of states;

subsampling said fine sequence of frames to obtain a coarse sequence comprising a predetermined number of frames, said predetermined numbers together defining a matrix having frame positions along one axis and state positions along another axis, there being a preselected region within said matrix which is examined by said method;

determining for each state position in said matrix the input frame which provides the best match with that state, irrespective of the frame determined in connection with any adjacent state position and considering and examining only frames which lie within said preselected region, and providing a measure of the degree of match;

combining the measures for the several state positions thereby to obtain a value representing the overall match of said coarse sequence of frames with the respective coarse sequence of states;

preselecting for accurate comparison those models with the better overall match values as so calculated.

7. The method as set forth in claim 6 wherein, in determining the input frame which provides the best match for each possible state in each possible matrix position, the method examines not only the respective subsampled frame but also a preselected number of frames which precede and follow the respective subsampled frame in said fine sequence of frames.

8. In a speech recognition system which compares an unknown speech segment represented by a fine sequence of frames with a vocabulary of models represented by respective fine sequences of states, said vocabulary being partitioned into acoustically similar groups of model with one model of each group being representative of the group thereby to determine the best matches; a computer implemented method of preselecting candidate models for accurate comparison, said method comprising:

for each model, subsampling the corresponding fine sequence of states to obtain a respective coarse sequence comprising a predetermined number of states;

subsampling said fine sequence of frames to obtain a coarse sequence comprising a predetermined number of frames, said predetermined numbers together defining a matrix having frame positions along one axis and state positions along another axis, there being a preselected region within said matrix which is examined by said method;

providing a first distance measuring function which determines for each state position in said matrix the input frame which provides the best match with that state, considering and examining only frames which lie within said preselected region, and provides a measure of the degree of match;

combining the measures for the several state positions thereby to obtain a first value representing the overall match of said coarse sequence of frames with the respective coarse sequence of states;

providing a second distance measuring function which determines a connected path across said matrix and calculates a second value representing the overall match of said coarse sequence of frames with the respective coarse sequence of states;

applying said first distance measuring function to the group representative models;

selecting the better scoring representative models and applying to the selected models said second distance measuring function thereby to identify a reduced number of better scoring groups;

applying said first distance measuring function to the members of said better scoring groups;

selecting the better scoring member models and applying to the selected member models said second distance measuring function thereby to preselect a reduced number of member models for accurate comparison with said unknown speech segment.

9. In a speech recognition system which compares an unknown speech segment represented by a fine sequence of frames with a vocabulary of models represented by respective fine sequences of states thereby to determine the best matches; a computer implemented method of selecting candidate models, said method comprising:

for each model to be considered, subsampling the corresponding fine sequence of states to obtain a respective coarse sequence comprising a predetermined number of states;

subsampling said fine sequence of frames to obtain a coarse sequence comprising a predetermined number of frames, said predetermined numbers together defining a matrix having frame positions along one axis and state positions along another axis, there being a preselected region within said matrix which is examined by said method;

determining for each state position in said matrix the input frame which provides the best match with that state, irrespective of the frame determined in connection with any adjacent state position and considering and examining only frames which lie within said preselected region, and providing a measure of the degree of match;

combining the measures for the several state positions thereby to obtain a value representing the overall match of said coarse sequence of frames with the respective coarse sequence of states;

selecting (for accurate comparison) those models with the better overall match values as so calculated; and for only those models with the better overall match values, comparing the fine sequence of frames with the respective fine sequence of states thereby to identify at least one recognition candidate model.

* * * * *